United States Patent
Kwan

(10) Patent No.: US 10,600,154 B2
(45) Date of Patent: Mar. 24, 2020

(54) SYSTEM AND METHOD FOR GENERATING HIGH-RESOLUTION STEREO IMAGE AND DEPTH MAP

(71) Applicant: Applied Research, LLC, Rockville, MD (US)

(72) Inventor: Chiman Kwan, Rockville, MD (US)

(73) Assignee: Applied Research, LLC, Rockville, MD (US)

( * ) Notice: Subject to any disclaimer, the term of this patent is extended or adjusted under 35 U.S.C. 154(b) by 38 days.

(21) Appl. No.: 16/018,328

(22) Filed: Jun. 26, 2018

(65) Prior Publication Data

US 2019/0392555 A1   Dec. 26, 2019

(51) Int. Cl.
*G06T 3/40*  (2006.01)
*G06T 7/593*  (2017.01)
*G06T 3/20*  (2006.01)

(52) U.S. Cl.
CPC ............... *G06T 3/40* (2013.01); *G06T 3/20* (2013.01); *G06T 7/593* (2017.01); *G06T 2207/20048* (2013.01)

(58) Field of Classification Search
CPC ........ G06K 9/4671; G06T 2207/10021; G06T 2207/10036; G06T 2207/10041; G06T 2207/20221; G06T 3/4007; G06T 3/4053; G06T 7/593; H04N 13/271
See application file for complete search history.

(56) References Cited

U.S. PATENT DOCUMENTS

2015/0288950 A1* 10/2015 Zhang ................ H04N 5/33
348/47

OTHER PUBLICATIONS

L. Alparone et al., "Spatial Methods for Multispectral Pansharpening: Multiresolution Analysis Demystified," in IEEE Transactions on Geoscience and Remote Sensing, vol. 54, No. 5, pp. 2563-2576, May 2016. (Year: 2016).*
X. Wan et al. , "3D super resolution scene depth reconstruction based on SkySat video image sequences," 2016 IEEE International Geoscience and Remote Sensing Symposium (IGARSS), pp. 6653-6656. Date of Conference: Jul. 10-15, 2016. Date Added to IEEE Xplore: Nov. 3, 2016 (Year: 2016).*

* cited by examiner

*Primary Examiner* — Ross Varndell
(74) *Attorney, Agent, or Firm* — IP-R-US, LLC; Peter Wong

(57) ABSTRACT

A system and method for generating high-resolution stereo images and depth map in multi-camera systems having multiple cameras with different resolutions and view angles. One method is to improve the lower resolution image and combining it with the higher resolution image, then the resulting image is processed by extensive algorithms to ensure utmost high quality. The system can also handle non-planar image contents. The process is to generate a crude depth map first and then divide the map into multiple layers. Each layer will be separately registered. The results from the registered layers will be merged to improve the depth map generation. The improved depth map could be repeatedly fed back to the beginning of the process to further improve the registration performance. The system and method can generate stereo images using uncalibrated cameras with different views and resolutions.

8 Claims, 9 Drawing Sheets

Signal flow of a new stereo image formation, disparity map, and depth map generation system.

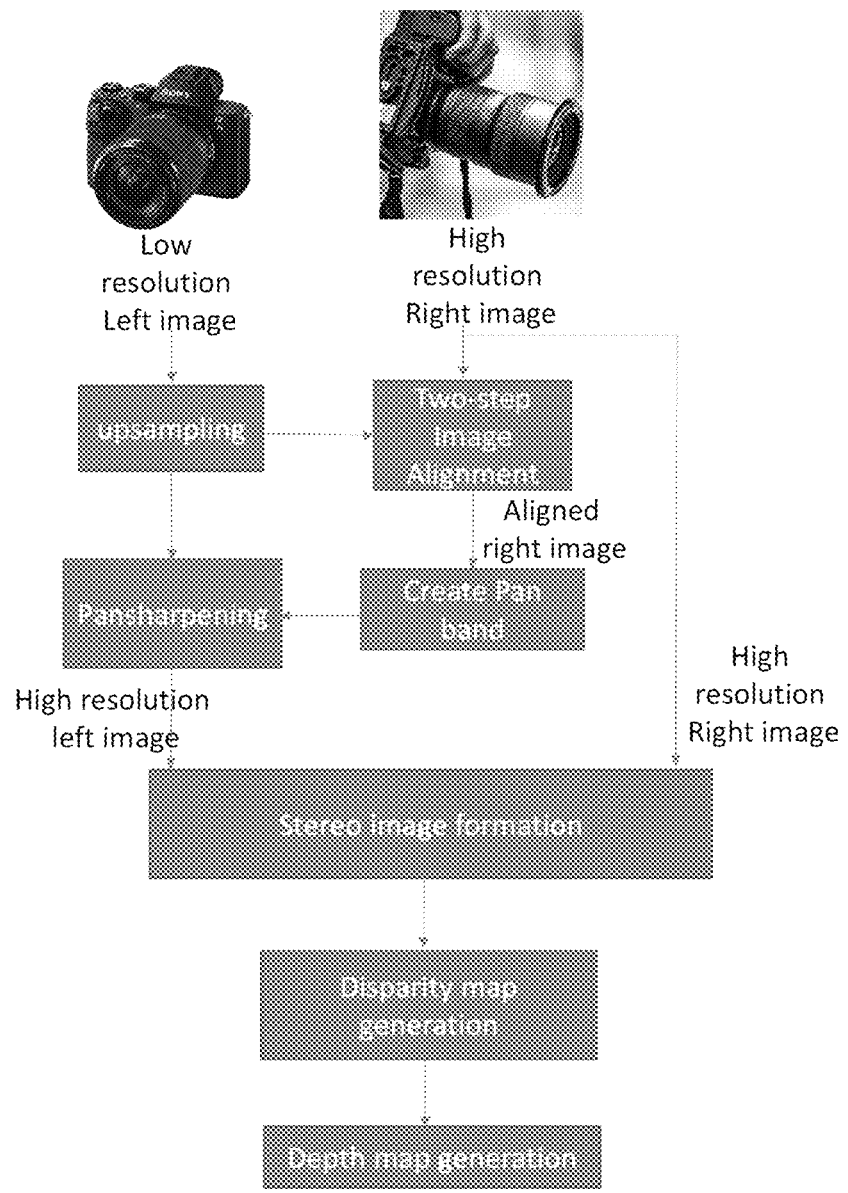
Fig. 1: Signal flow of a new stereo image formation, disparity map, and depth map generation system.

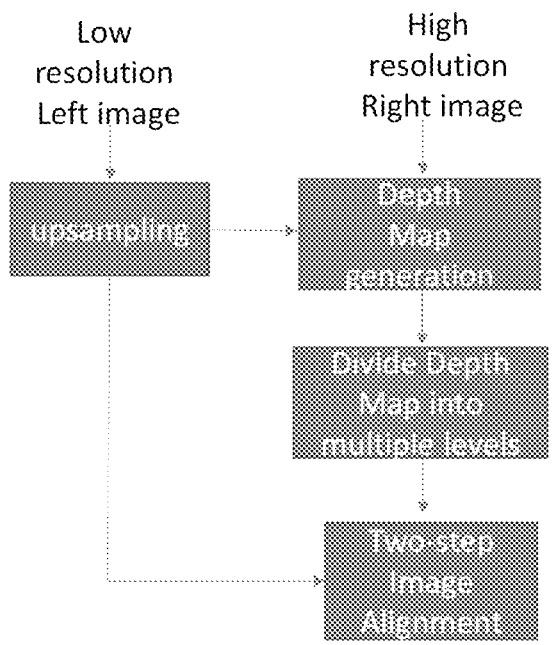
Fig. 2: Alignment scheme to deal with non-coplanar image contents.
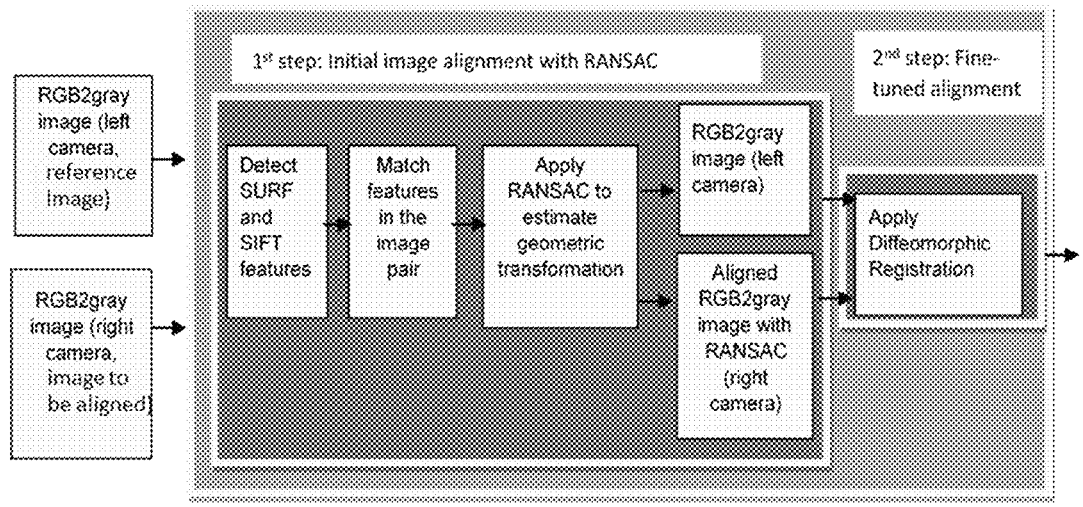
Fig. 3. Block diagram of the two-step image alignment approach.

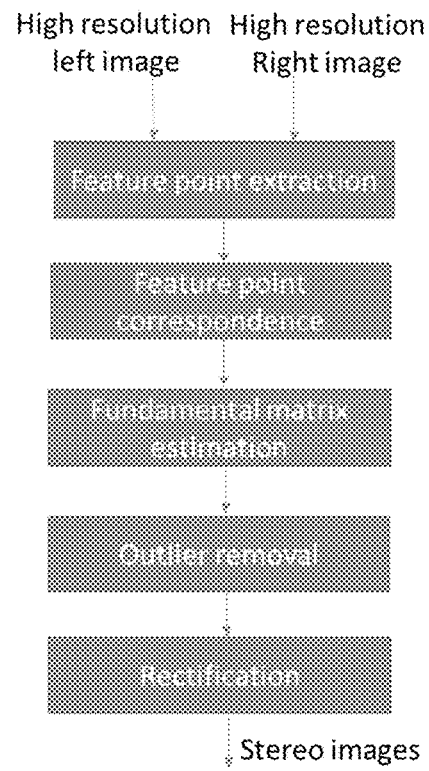
Fig. 4: Procedures in stereo image formation.
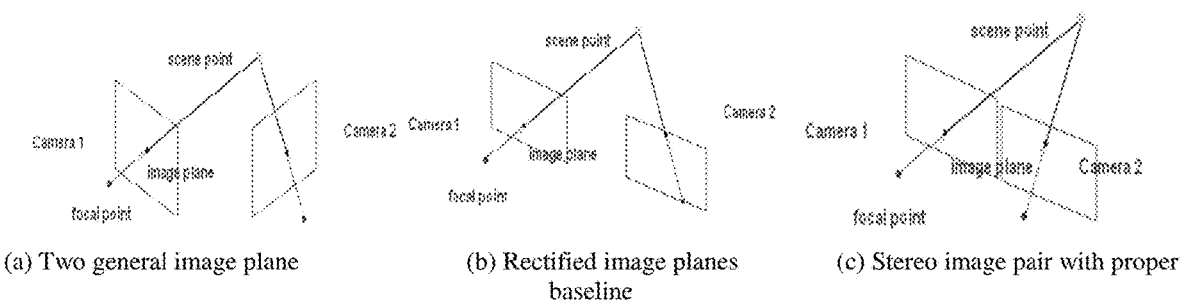
(a) Two general image plane  (b) Rectified image planes baseline  (c) Stereo image pair with proper
Fig. 5: Image Rectification

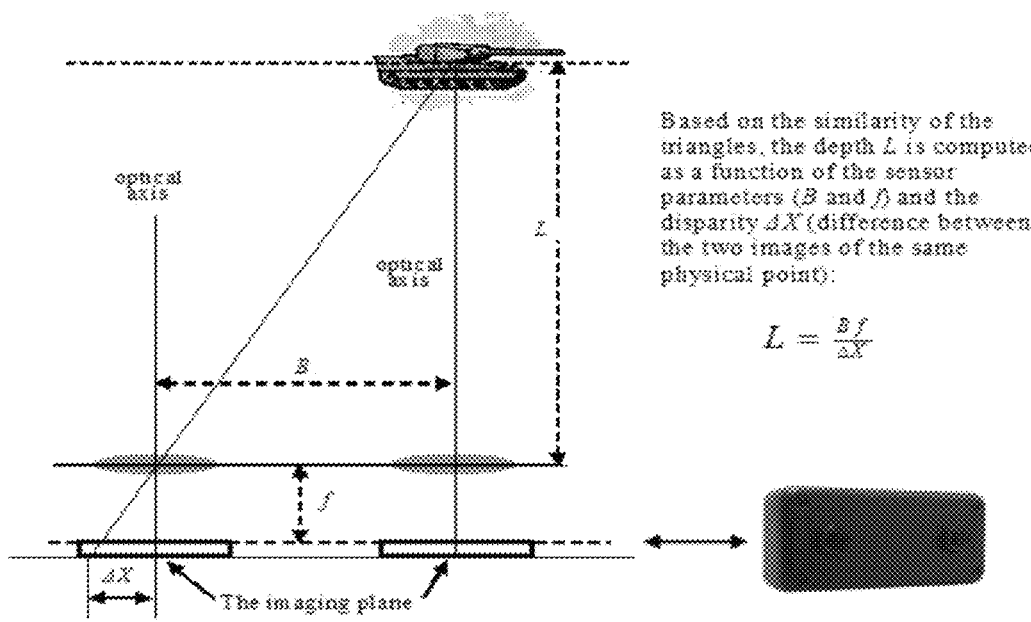
Fig. 6: Relationship between disparity and depth.
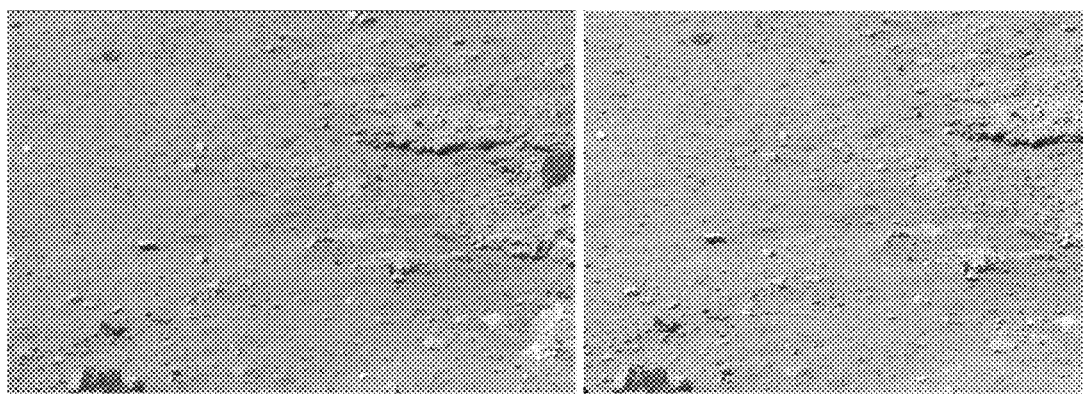
Fig. 7: Original images. Left image: left Mastcam; Right image: right Mastcam.

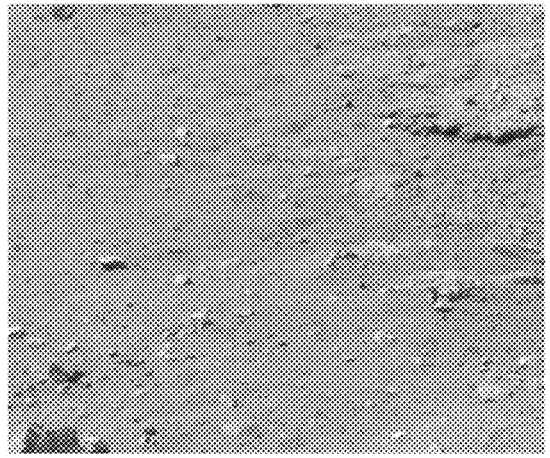
Fig. 8: Cropping Original Left image then upsampling.
Fig. 9: Matched feature points for aligning Right image to Left image (smaller image is Left image).
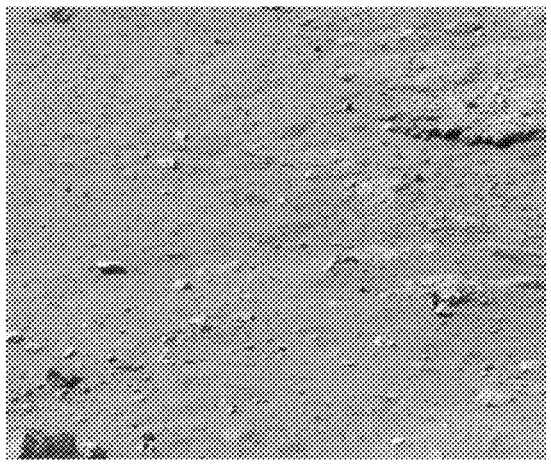
Fig. 10: Right image on top of Left image after alignment.

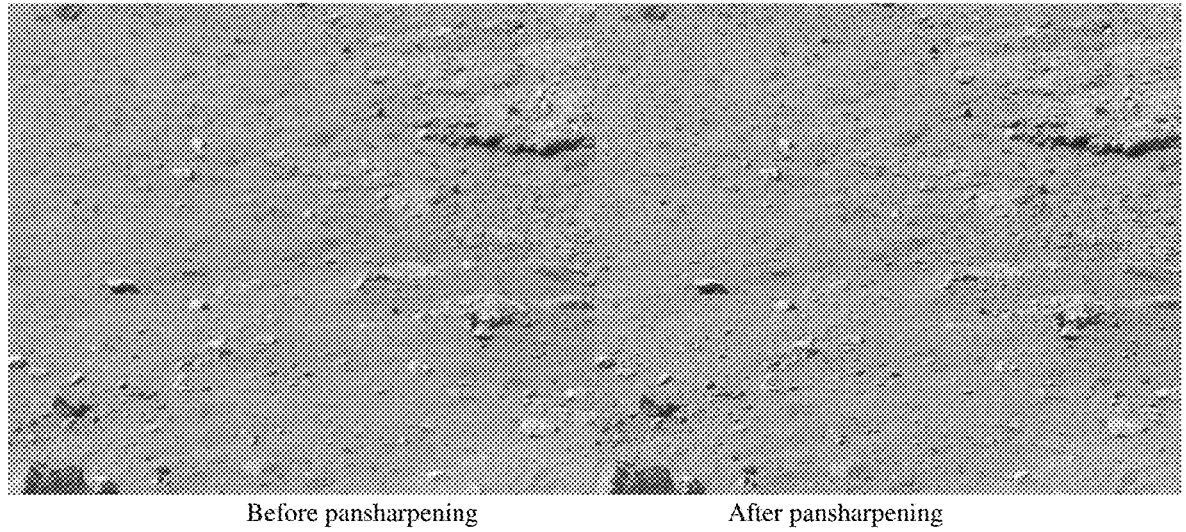
Fig. 11: Left: image before pansharpening; right: image after pansharpening.
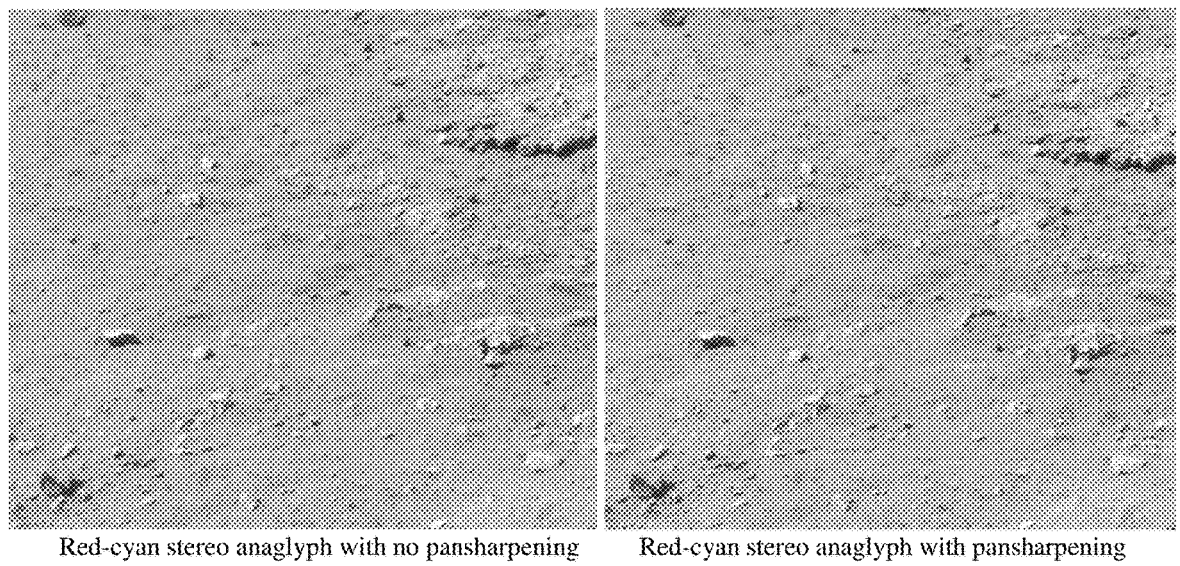
Fig. 12: Rectified stereo images.

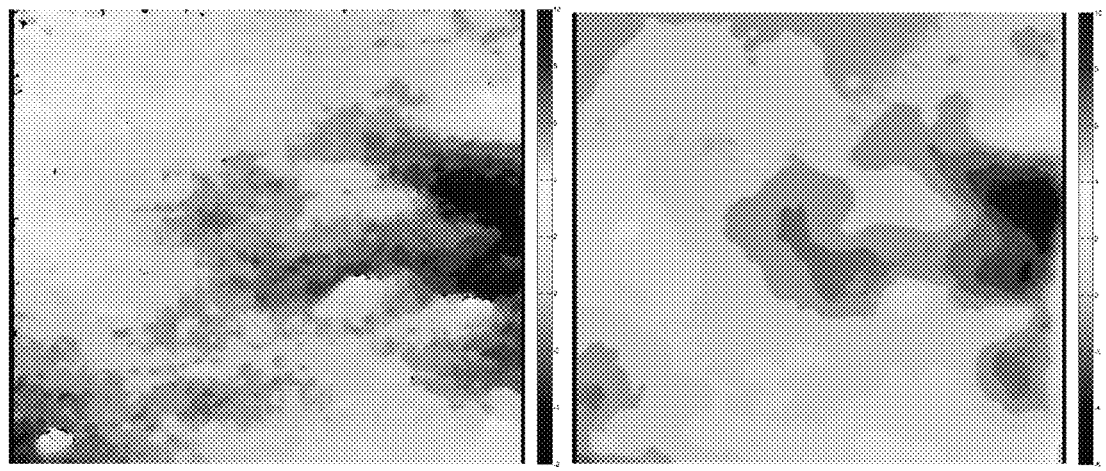
Fig. 13: Depth maps without (left) and with pansharpening (right).
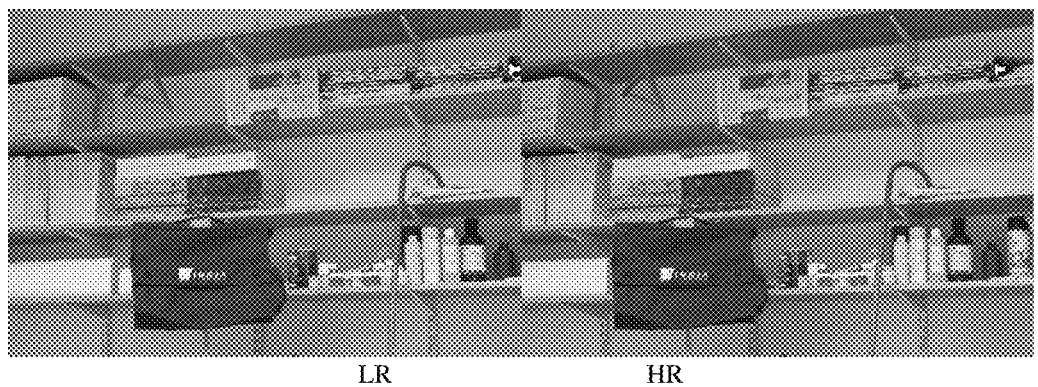
Fig. 14: Left original low resolution (LR) and Right high resolution (HR) images.
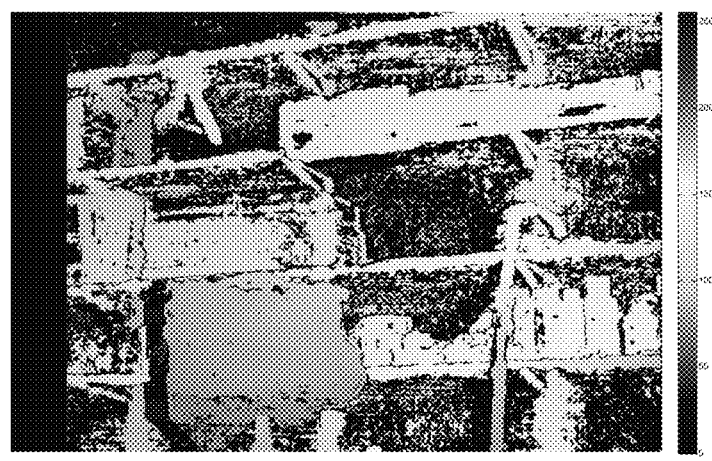
Fig. 15: Depth map generated using LR left and HR right images

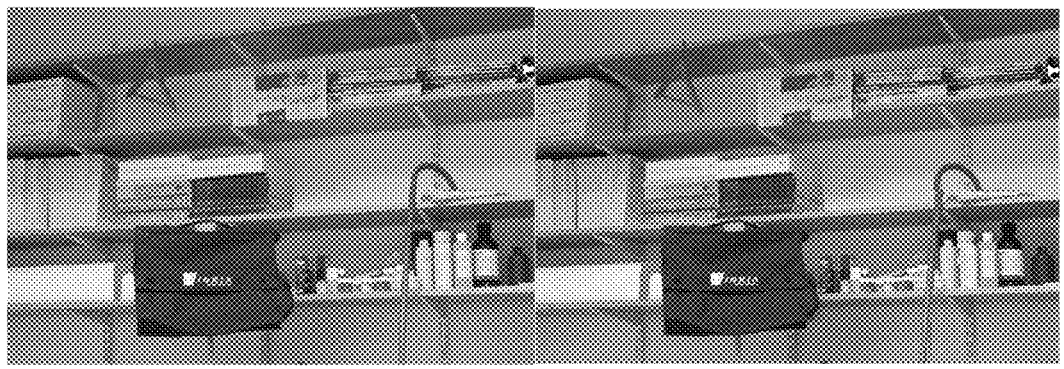
Original left            Pansharpened left
Fig. 16: Comparison of original and pansharpened left images
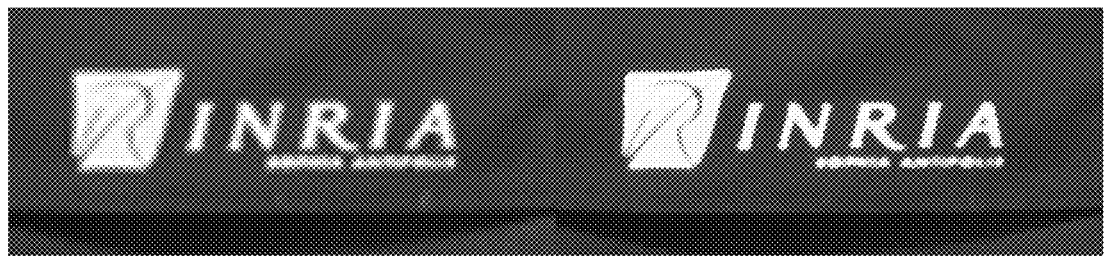
Original left;            Pansharpened left
Fig. 17: Zoomed version of the previous image in Fig..

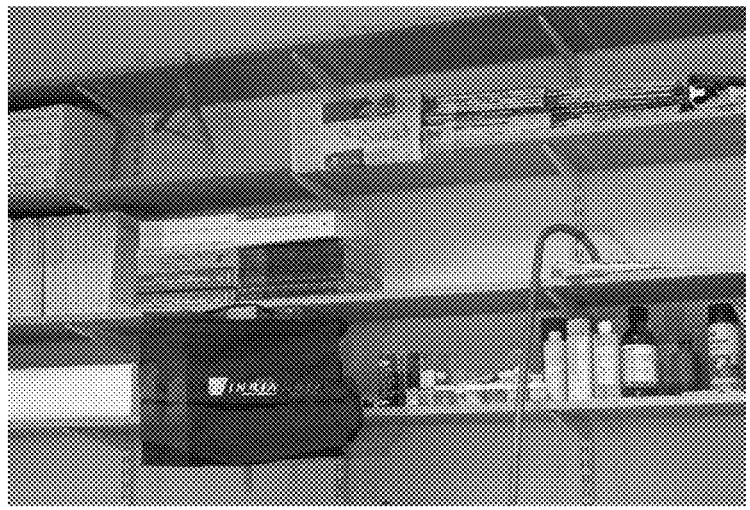
Fig. 18: Stereo image formed by using pan-sharpened left and original right images.
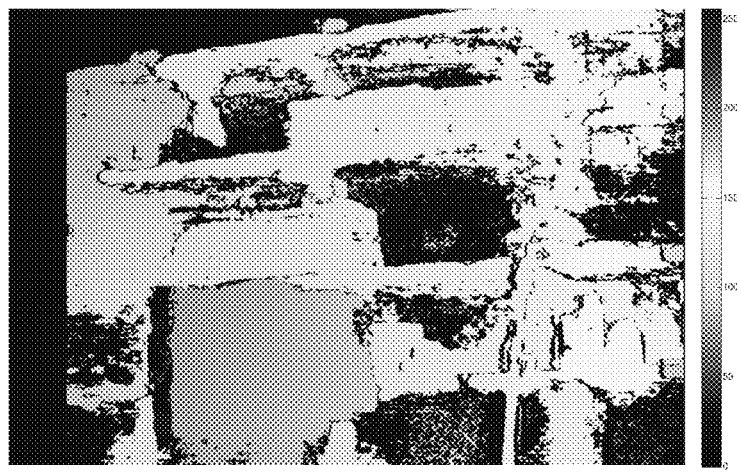
Fig. 19: Depth map estimated using pan-sharpened left image and original right image.

SYSTEM AND METHOD FOR GENERATING HIGH-RESOLUTION STEREO IMAGE AND DEPTH MAP

BACKGROUND OF THE INVENTION

A stereo camera, also called dual camera, is a type of camera with two or more lenses with a separate image sensor for each lens. This allows the camera to simulate human binocular vision, gives it the ability to capture three-dimensional images, a process known as stereo photography. In smartphone technology, a stereo camera is commonly referred to as a dual camera for capturing both still images and videos.

In 2011, dual/stereo cameras were introduced in HTC smartphones to capture 3D images. Since then, smartphone manufacturers kept experimenting with the technology, but it never really took off. In 2014, HTC re-introduced its Duo camera setup and its improved depth of field effect. In 2016, dual cameras have evolved to deliver excellent results in modern smartphones. A dual camera can help in getting a sharper image with more details, enable an ultra-wide-angle mode or simply take photos with a shallow depth of field to make the subject more stand out. The dual camera setup can also add 1× or 2× optical zoom to the phone.

In some stereo cameras, such as the Mastcam imagers onboard the Mars rover Curiosity, the smartphone dual camera technology has not been practically applied. Some of the obstacles are the much more involved algorithms required and the cost of implementing such system in the Mastcam imagers. The left and right cameras of the Mastcam imager usually have different resolutions. Moreover, the cameras are not calibrated for stereo image formation, as they normally work independent of each other.

To generate stereo images from these two cameras with different resolutions, a common practice is to downsample the high resolution camera image to the same as the lower one. After that, the stereo images are formed by following some standard procedures. It is known that the downsampling of the high resolution camera image is more economical but less effective, as the resulting stereo images will have lower resolution. The resulting depth map derived from the resulting stereo images also has a low resolution.

BRIEF SUMMARY OF THE INVENTION

The present invention is to generate high resolution stereo images and depth map by improving the lower resolution image and then combining it with the higher resolution image. The resulting image is further processed by extensive algorithms to ensure the captured images by both cameras are of utmost high quality.

One objective of the present invention is to provide a method and system, which can generate stereo images using two cameras with different resolutions and different view angles. One camera (for example, left) can be of lower resolution than that of the right camera.

Another objective of the present invention is to provide a method and system that can handle non-planar image contents. The idea is to generate a crude depth map first and then divide the map into multiple layers. Each layer will be separately registered. All the registration results from all layers will be merged later to improve the depth map generation. After the depth map has been improved, it can be fed back to the beginning step to further improve the registration performance. This iteration process can be repeated multiple times.

Another objective of the present invention is to provide a method and system that can generate stereo images using uncalibrated cameras with different views and resolutions.

Another objective of the present invention is to apply a two-step image registration to align the left and right images to subpixel accuracy.

Another objective of the present invention is to apply any appropriate pansharpening algorithms to improve the low resolution images with help from the high resolution right images.

Another objective of the present invention is to apply feature point extraction, feature point matching, fundamental matrix estimation, outlier removal, and image rectification algorithms to generate high resolution stereo images.

Another objective of the present invention is to generate high resolution disparity map using the high resolution stereo images generated by our proposed system.

Another objective of the present invention is that the depth of any pixels can be extracted from the high resolution disparity map.

Another objective of the present invention is that the method and system can be used for stereo imaging in infrared imagers, color cameras, multispectral imagers, and hyperspectral imagers. For imagers having more than 3 bands, we can select any 3 bands to form stereo images.

Another objective of the present invention is that the system can be applied to two stationary cameras with different resolutions or a moving camera. For a moving camera, we do not need the second camera. The single camera can perform zoom-in or zoom-out operations.

Yet another objective of the present invention is that the algorithms can be implemented in low cost Digital Signal Processor (DSP) and Field Programmable Gate Array (FPGA) for real-time processing.

BRIEF DESCRIPTION OF THE DRAWINGS

FIG. 1: Signal flow of a new stereo image formation and depth map generation system.

FIG. 2: Alignment scheme to deal with non-coplanar image contents.

FIG. 3. Block diagram of the two-step image alignment approach.

FIG. 4: Procedures in stereo image formation.

FIG. 5: Image rectification.

FIG. 6: Relationship between disparity and depth.

FIG. 7: Original images. Left: left Mastcam; right: right Mastcam.

FIG. 8: Cropping left image then upsampling.

FIG. 9: Matched feature points for aligning right image to left (smaller image is left image).

FIG. 10: Right image on top of left image after alignment.

FIG. 11: Left: image before pansharpening; right: image after pansharpening.

FIG. 12: Rectified stereo images.

FIG. 13: Depth maps without pansharpening (left) and with pansharpening (right).

FIG. 14: Left original low resolution (LR) and Right high resolution (HR) images.

FIG. 15: Depth map generated using LR left and HR right images.

FIG. 16: Comparison of original and pansharpened left images.

FIG. 17: Zoomed version of the previous image in FIG. 16.

FIG. 18: Stereo image formed by using pan-sharpened left and original right images.

FIG. 19: Depth map estimated using pan-sharpened left image and original right image.

DETAILED DESCRIPTION OF THE INVENTION

The present invention utilizes a new approach to high resolution stereo image formation and high resolution depth map generation. As shown in FIG. 1, the approach consists of the following steps:

1. First, an accurate two-step image registration approach is used to align the left and right images. The left image is used as the reference for registration. The coarse step is to use Scale Invariant Features Transform (SIFT) or Speeded Up Robust Features (SURF) features with Random Sample Consensus (RANSAC). The fine step is to apply a diffeomorphic algorithm to achieve sub-pixel accuracy. The common area between the left and right images is then extracted. The alignment can achieve sub-pixel accuracy. In the event that the image contents are not coplanar, we propose a scheme shown in FIG. 2 to use the upsampled left image and the right image to get a depth map. We then divide the depth map into many layers and perform registration for each layer separately. The alignment results from different layers are then merged.
2. Second, a Panchromatic (pan) band is created using the multispectral bands in the right image. One simple way to create the pan band is to take the average of all the available bands in the right camera. Any pansharpening algorithms, References [5]-[14], can be used for pansharpening. In the examples of the present invention, a pansharpening algorithm known as Gram-Schmidt Adaptive (GSA) algorithm was used to pansharpen the left image.
3. Third, the pansharpened left image and the original high resolution right image are then used to create a stereo image. In the stereo image creation process, some standard procedures, including feature points extraction, feature points matching between left and right images, estimation of fundamental matrix, outliers removal based on epipolar constraint, and image rectification, can be used.
4. Fourth, based on the stereo image, a disparity map and a depth map can then be generated.

FIG. 1 and FIG. 2 show the signal flow. In the subsequent sections, the key algorithms could be utilized in the present invention are summarized.

Two-step Image Registration

The block diagram of the two-step image alignment approach is shown in FIG.. The first step of the two-step image alignment approach is using RANSAC (Random Sample Consensus) technique, Reference [1], for an initial image alignment. In this first step, we use the two RGB images from the left and right imagers. The left image is first upsampled using bicubic interpolation to the same resolution of the right image. First, SURF features, Reference [2] and SIFT features, References [3][4], are extracted from the two images. These features are then matched within the image pair. This is followed by applying RANSAC to estimate the geometric transformation. Assuming the left camera image is the reference image, the right camera image content is then projected into a new image that is aligned with the reference image using the geometric transformation.

The second step of the two-step alignment approach uses this aligned right image with RANSAC and the left camera image as inputs and applies the Diffeomorphic Registration, Reference [3], technique. Diffeomorphic Registration is formulated as a constrained optimization problem, which is solved with a step-then-correct strategy, Reference [3]. This second step reduces the registration errors to subpixel levels and makes it possible to conduct accurate pansharpening.

Pansharpening Algorithm

The goal of pansharpening, References [5]-[14], is to fuse a low-spatial resolution left image with a high-spatial resolution panchromatic image (pan) from the right camera. In the present invention, after the two-step registration, the image from the left camera can be considered as a blurred version of the right one. The images from the left camera are sharpened by pansharpening using high spatial resolution images from the right camera as the panchromatic reference image.

Pansharpening techniques can be classified into two main categories:

(1) the Component Substitution (CS) approach; and
(2) the MultiResolution Analysis (MRA) approach.

The CS approach is based on the substitution of a component with the pan image and the MRA approach relies on the injection of spatial details that are obtained through a multiresolution decomposition of the pan image into the resampled MS bands. In the present invention, we focus on the CS-based approach. Under the assumption that the components containing the spatial structure of multispectral images at all spectral bands are highly correlated, the transformed low-resolution MS images can be enhanced by substituting the components containing the spatial structure of the pan image through a histogram matching. The output pansharpened data are finally achieved by applying the inverse transformation to project the data back to the original space.

The Gram-Schmidt Adaptive (GSA), Reference [5], algorithm is applied for its simplicity and performance in our experiments.

Stereo Image Formation

FIG. 4 shows the key steps in stereo image formation. Given a pansharpened left image and the original high resolution right image, we first perform a feature points extraction. This step is similar to the two-step image registration described earlier. Both SIFT and SURF features can be used. In the past, we found that SIFT features are more robust than SURF features. Second, the feature correspondence can be achieved with RANSAC, which matches feature points that belong to the same physical locations. Third, the fundamental matrix is estimated based on the corresponded feature points. Fourth, outliers are removed using the epipolar constraint. Finally, an image rectification step is performed.

FIG. 5 illustrates the stereo rectification process. "Camera 1" and "Camera 2" are arranged in different image planes as illustrated in FIG. 5(a); the purpose is to get a true stereo pair from these two images through image rectification. The rectification process can be broken down into two steps. First, by finding and applying a homography to each image, these two images are transformed into new ones, which are identical to the ones captured by two parallel cameras, as illustrated in FIG. 5(b). Second, the wide or narrow baseline of the two parallel cameras is adjusted to a proper value (e.g. standard base line) by translating the new images with a proper value. Thus, the desired stereo pair is constructed in FIG. 5(c).

Disparity Estimation

Disparity is the difference between two pixels that correspond to the same physical point in the stereo image pair. Once the stereo images are created, a feature correspondence process is needed to determine the pixels that belong to the same physical point. Based the feature correspondence results, the disparity map is computed for every pixel in the image.

Depth Estimation

FIG. 6 illustrates the relationship between depth and disparity. Once disparity map is found, we can use the following formula to compute the depth, L, for each pixel.

$$L=Bf/\Delta X$$

where B is the baseline between the two cameras, f is the focal length, and $\Delta X$ is the disparity at a particular pixel.

Experimental Results

In the following figures, FIG. 7 to FIG. 13, we will illustrate how to apply the proposed stereo image formation and depth map generation to a real Mastcam image pair. Referring to FIG. 7, it shows the original left and right images. Left image has low resolution and normally has a wide field of view. In our 2-step image registration algorithm, the left image is required to be smaller than the right image. The cropped and upsampled left image is shown in FIG. 8. The SURF features are extracted by running the RANSAC algorithm, and then apply the fine registration using the diffeomorphic algorithm. The aligned feature points are shown in FIG. 9. FIG. 10 shows the aligned image with left image overlaid on top of the right. A pan band can be created by using the aligned right image. Pansharpening is performed to improve the resolution of the left image with help from the pan band of the right. The resulting pansharpened image using the GSA algorithm is shown in the right-hand side of FIG. 11.

The stereo images could then be created by using two methods:
1. to use the low resolution left image and the downsampled right image; and
2. to use the high resolution left and right images.

Both stereo images are shown in FIG. 12. Finally, the disparity maps from the two stereo images are shown in FIG. 13. It can be seen the disparity map from the high resolution stereo image pair looks smoother than that without pansharpening.

FIG. 14 to FIG. 19 show the application of the proposed system in the present invention to another pair of images that have non-planar image contents. Referring to FIG. 15, Depth map is generated using low resolution left image and high resolution right image. This map is divided into multiple layers and each layer will be separately registered. The registration results from different layers will be merged into a single one. The aligned right image is then used for creating the pan band for pansharpening the left image. All the subsequent steps (stereo and disparity generation) will be the same as mentioned before.

In FIG. 16, the original image and the pansharpened left image are compared. A specific area of FIG. 16 is zoomed out to further illustrate the pansharpened left image as shown in FIG. 17. The resultant stereo image shown in FIG. 18 is formed by using the pansharpened left image and the original right images. Finally, the Depth map is generated by using the pansharpened left image and the original right image as shown in FIG. 19.

It will be apparent to those skilled in the art that various modifications and variations can be made to the system and method of the present disclosure without departing from the scope or spirit of the disclosure. It should be perceived that the illustrated embodiments are only preferred examples of describing the invention and should not be taken as limiting the scope of the invention.

REFERENCES

[1] R. Hartley and A. Zisserman, Multiple View Geometry in Computer Vision, Cambridge University Press, 2003.

[2] H. Bay, A. Ess, T. Tuytelaars, and L. Van Gool. "SURF: Speeded Up Robust Features," Computer Vision and Image Understanding (CVIU). Vol. 110, No. 3, pp. 346-359, 2008.

[3] B. Ayhan, M. Dao, C. Kwan, H. Chen, J. F. Bell III, and R. Kidd, "A Novel Utilization of Image Registration Techniques to Process Mastcam Images in Mars Rover with Applications to Image Fusion, Pixel Clustering, and Anomaly Detection," IEEE Journal of Selected Topics in Applied Earth Observations and Remote Sensing, Vol. 10, Issue: 10, Pages: 4553-4564, 2017.

[4] D. G. Lowe, "Object recognition from local scale-invariant features." *IEEE International Conference on Computer Vision*, vol. 2, pp. 1150-1157, 1999.

[5] G. Vivone, L. Alparone, J. Chanussot, M. Dalla Mura, Garzelli, and G. Licciardi, "A critical comparison of pansharpening algorithms," *IEEE Int. Conf. Geoscience and Remote Sensing (IGARSS)*, pp. 191-194, July 2014.

[6] J. Zhou, C. Kwan, and B. Budavari, "Hyperspectral Image Super-Resolution: A Hybrid Color Mapping Approach," SPIE Journal of Applied Remote Sensing, Vol. 10, 035024, 2016.

[7] C. Kwan, J. H. Choi, S. Chan, J. Zhou, and B. Budavari, "Resolution Enhancement for Hyperspectral Images: A Super-Resolution and Fusion Approach," IEEE International Conference on Acoustics, Speech, and Signal Processing, New Orleans, March 2017.

[8] M. Dao, C. Kwan, B. Ayhan, and J. Bell, "Enhancing Mastcam Images for Mars Rover Mission," 14th International Symposium on Neural Networks, Hokkaido, Japan, June 2017.

[9] C. Kwan, B. Budavari, M. Dao, B. Ayhan, and J. F. Bell, "Pansharpening of Mastcam images," *IEEE International Geoscience and Remote Sensing Symposium (IGARSS)*, Fort Worth, July 2017.

[10] C. Kwan, B. Ayhan, and B. Budavari, "Fusion of THEMIS and TES for Accurate Mars Surface Characterization," *IEEE International Geoscience and Remote Sensing Symposium (IGARSS)*, Fort Worth, July 2017.

[11] C. Kwan, B. Budavari, A. Bovik, and G. Marchisio, "Blind Quality Assessment of Fused WorldView-3 Images by Using the Combinations of Pansharpening and Hypersharpening Paradigms," *IEEE Geoscience and Remote Sensing Letters*, Volume: 14, Issue: 10, pp. 1835-1839, 2017.

[12] B. Ayhan, M. Dao, C. Kwan, H. Chen, J. F. Bell III, and R. Kidd, "A Novel Utilization of Image Registration Techniques to Process Mastcam Images in Mars Rover with Applications to Image Fusion, Pixel Clustering, and Anomaly Detection," *IEEE Journal of Selected Topics in Applied Earth Observations and Remote Sensing*, Vol. 10, Issue: 10, Pages: 4553-4564, 2017.

[13] C. Kwan, J. Zhou, and B. Budavari, "A New Pansharpening Approach for Hyperspectral Images," Colorimetry and Image Processing, InTech, 2018.

[14] Y. Qu, H. Qi, B. Ayhan, C. Kwan, and R. Kidd, "Does Multispectral/Hyperspectral Pansharpening Improve the Performance of Anomaly Detection?" *IEEE International Geoscience and Remote Sensing Symposium (IGARSS)*, Fort Worth, July 2017.

[15] X. Li, C. Kwan, and B. Li, "Stereo Imaging with Uncalibrated Camera," *Advances in Visual Computing,*

*Second International Symposium*, ISVC 2006, Lake Tahoe, N.V., USA, Nov. 6-8, 2006.

[16] Y. Qu, H. Qi, B. Ayhan, C. Kwan, and R. Kidd, "Does Multispectral/Hyperspectral Pansharpening Improve the Performance of Anomaly Detection?" *IEEE International Geoscience and Remote Sensing Symposium (IGARSS)*, Fort Worth, July 2017.

The invention claimed is:

1. A system for generating high-resolution stereo image and depth map comprising:
    a first camera having a first image;
    a second camera having a second image;
    an up-sampler connected to the first image;
    a two-step image alignment module is connected to a first output of the up-sampler and the second image;
    a pan-sharpening module is connected to a second output of the up-sampler;
    a pan band creator is connected to an output of the two-step image alignment module to provide an input to the pan-sharpening module for producing a first high resolution image;
    a stereo image generator for combining the first high resolution image and the second image to generate a stereo image;
    a disparity map generator receives the stereo image to generate a disparity map;
    the generated disparity map is connected to a first input of a depth map generator;
    a divider connected between the depth map generator and the two-step image alignment module; and
    the depth map generator receives a third output from the up-sampler.

2. The system for generating high-resolution stereo image and depth map as claim in claim 1, wherein,
    the first image is a low resolution image, and the second image is a high resolution image.

3. The system for generating high-resolution stereo image and depth map as claim in claim 2, wherein,
    the divider divides an output of the depth map generator into multiple levels to manage any non-coplanar image contents.

4. The system for generating high-resolution stereo image and depth map as claim in claim 1, wherein,
    the first and second cameras are uncalibrated with different views and resolutions.

5. A method for generating high-resolution stereo image and depth map comprising the steps of:
    upsampling a first image;
    combining the upsampled first image and a second image to generate a second depth map;
    dividing the second generated depth map into multiple levels;
    registering the multiple levels individually;
    merging all the registered levels to improve the second depth map;
    aligning the divided depth map with the upsampled first image;
    creating a Panchromatic (pan) band using multispectral bands of the second image;
    pansharpening the upsampled first image with the pan band created by the second image to generate a high resolution left image;
    forming a stereo image using the high resolution left image and the second image;
    generating a disparity map using the stereo image; and
    generating a first depth map using the disparity map.

6. The method for generating high-resolution stereo image and depth map as claim in claim 5, wherein,
    the second image is of high resolution; and
    the improved depth map is repeatedly fed back to the first depth map generating step to further improve the registering performance.

7. The method for generating high-resolution stereo image and depth map as claim in claim 5, wherein,
    the registering step is performed by Scale Invariant Features Transform (SIFT) or Speeded Up Robust Features (SURF) with Random Sample Consensus (RANSAC).

8. The method for generating high-resolution stereo image and depth map as claim in claim 5, wherein,
    the pan sharpening step is performed by Gram-Schmidt Adaptive (GSA) algorithm.

* * * * *